US007832638B2

(12) United States Patent
Wetzel et al.

(10) Patent No.: US 7,832,638 B2
(45) Date of Patent: Nov. 16, 2010

(54) INSPECTION DATA RECORDING APPARATUS AND METHOD

(75) Inventors: Robert Alan Wetzel, Melbourne, FL (US); Patrick Joseph Venneman, Blue Springs, MO (US)

(73) Assignee: General Electric Company, Schenectady, NY (US)

( * ) Notice: Subject to any disclaimer, the term of this patent is extended or adjusted under 35 U.S.C. 154(b) by 1421 days.

(21) Appl. No.: 10/901,746

(22) Filed: Jul. 28, 2004

(65) Prior Publication Data

US 2005/0023347 A1 Feb. 3, 2005

Related U.S. Application Data

(60) Provisional application No. 60/490,861, filed on Jul. 29, 2003.

(51) Int. Cl.
*G06F 19/00* (2006.01)

(52) U.S. Cl. ...................................................... 235/385

(58) Field of Classification Search ................. 235/385; 705/28; 324/307; 701/50
See application file for complete search history.

(56) References Cited

U.S. PATENT DOCUMENTS

| | | | |
|---|---|---|---|
| 4,688,026 | A | 8/1987 | Scribner et al. |
| 5,032,083 | A | 7/1991 | Friedman |
| 5,470,233 | A | 11/1995 | Fruchterman et al. |
| 5,528,248 | A | 6/1996 | Steiner et al. |
| 5,938,721 | A | 8/1999 | Dussell et al. |
| 6,266,612 | B1 | 7/2001 | Dussell et al. |
| 6,317,060 | B1 | 11/2001 | Jones |
| 6,411,899 | B2 | 6/2002 | Dussell et al. |
| 6,446,004 | B1 | 9/2002 | Cao et al. |
| 6,453,237 | B1 | 9/2002 | Fuchs et al. |

(Continued)

FOREIGN PATENT DOCUMENTS

| | | |
|---|---|---|
| EP | 1081659 A | 3/2001 |

(Continued)

OTHER PUBLICATIONS

Electronic FRA Test and Inspection System. General Overview. 10EAST, Inc. (16 pages).

(Continued)

*Primary Examiner*—Daniel A Hess
(74) *Attorney, Agent, or Firm*—Robert Wawrzyn, Esq.; Terry M. Sanks, Esq.; Beusse Wolter Sanks Mora & Maire, P.A.

(57) ABSTRACT

A system (10) and method for recording inspection data for geographically remote equipment assets. A portable inspection data recording device (14) is transported by a mobile inspector to a plurality of locations of equipment (12) to be inspected. The data recording device includes a location detection device (32), and a unique equipment identifier is associated with each remote equipment location, so that travel instructions may be displayed for directing the inspector to the location of selected equipment. Recordation of inspection data for selected equipment is enabled only when the portable inspection data recording device is located proximate the selected equipment. Data recordation may be enabled by displaying an equipment-specific data recordation form on input/output display (40) having selected data field automatically populated in response to the selected unique equipment identifier.

26 Claims, 3 Drawing Sheets

U.S. PATENT DOCUMENTS

| | | | | |
|---|---|---|---|---|
| 6,621,452 | B2 | 9/2003 | Knockeart et al. | |
| 6,671,698 | B2 * | 12/2003 | Pickett et al. | 707/104.1 |
| 2002/0049538 | A1 | 4/2002 | Knapton et al. | |
| 2002/0125886 | A1 * | 9/2002 | Bates et al. | 324/307 |
| 2003/0061159 | A1 | 3/2003 | Adams et al. | |
| 2003/0069694 | A1 | 4/2003 | Fuchs et al. | |
| 2003/0132855 | A1 | 7/2003 | Swan | |
| 2004/0236489 | A1 * | 11/2004 | Shibamori et al. | 701/50 |

FOREIGN PATENT DOCUMENTS

| | | |
|---|---|---|
| EP | 1280119 A | 1/2003 |
| GB | 2375407 A | 11/2002 |

OTHER PUBLICATIONS

Personal Mobile Tool. 10EAST, Inc. www.10east.com/index.cgi?sect=personal mobile tool (Jul. 28, 2003) (3 pages).

10East teams up with Sharp Electronics to equip CSX maintenance forces with a data collection, management, and reporting solution for monitoring Federally mandated safety compliance of the railroads infrastructure. 10EAST, Inc. (7 pages).

Sun Microsystems. Sun's Java 2 Platform, Micro Edition (J2ME) Enables Wirless Phone to Serve as Cost-Effective Input Device for Mobile Task Management Solution. WlredTime.com.

Personal Mobile Tool. 10EAST, Inc. www.10east.com/index.cgi?sect=personal mobile tool (Jul. 28, 2003) (3 pages).

* cited by examiner

INSPECTION DATA RECORDING APPARATUS AND METHOD

This application claims benefit of the 29 Jul. 2003 filing date of U.S. provisional Application No. 60/490,861.

FIELD OF THE INVENTION

The present invention relates generally to the inspection of remotely located assets such as railway system equipment.

BACKGROUND OF THE INVENTION

Railroad system assets must be inspected periodically, and the resulting inspection data must be reported in accordance with Federal Railroad Administration (FRA) guidelines. Inspectors travel to the various track, wayside, grade crossing and signaling component locations to perform inspections and to record the resulting inspection data. Traditionally, inspection forms used to record such inspection data had been hard copy paper forms. Systems currently being developed are able to record the inspection data in electronic format using a portable electronic tool. These systems improve the accuracy of the data recordation process by permitting data entry via pull-down menus, button selection for simple yes/no answers, automatic data range checking, etc. However, there is still an opportunity for erroneous data entry resulting from mistaken equipment identification, and there is the possibility of fictitious data entry by an unscrupulous inspector.

DETAILED DESCRIPTION OF THE INVENTION

Figure 1:
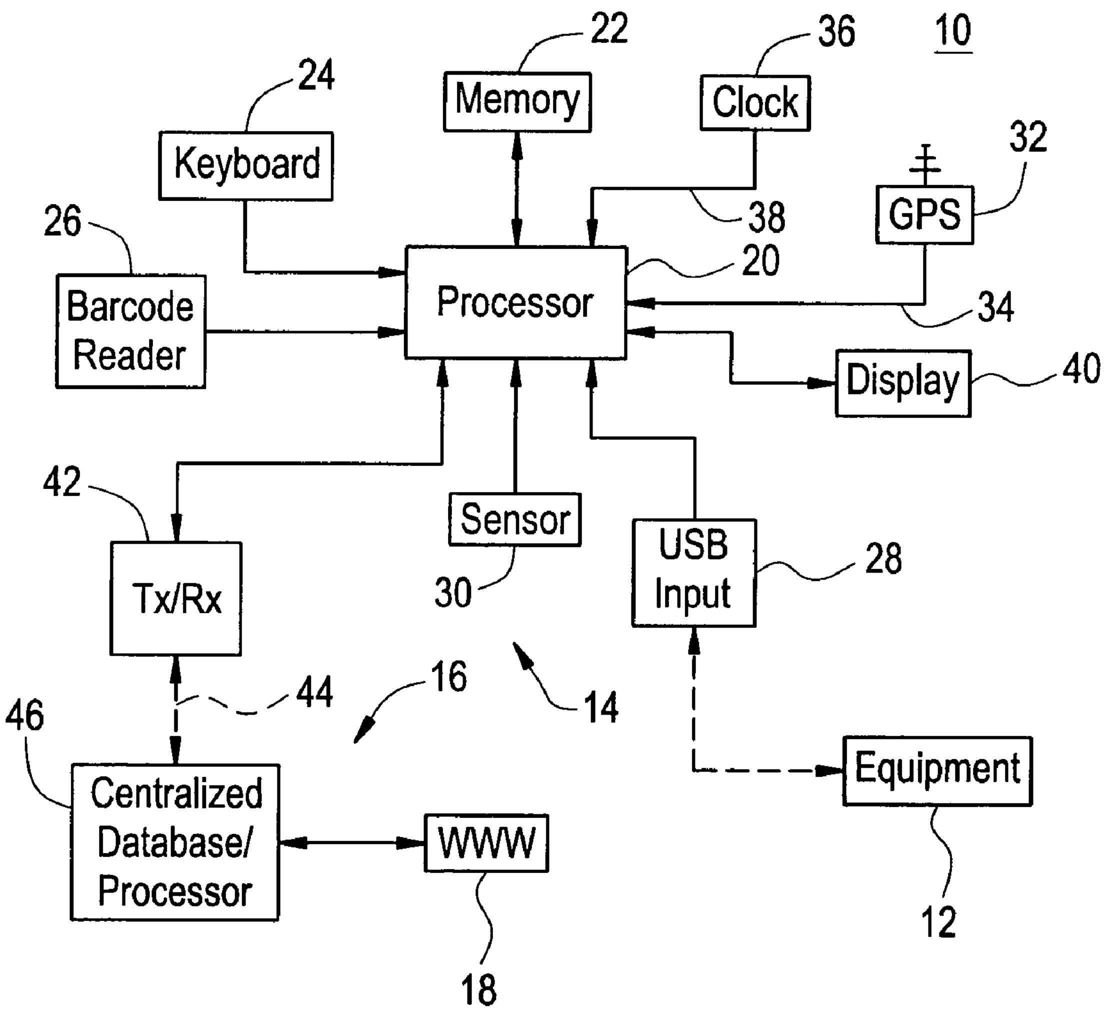
FIG. 1 is a schematic illustration of an equipment inspection data recording system.

FIG. 1 illustrates a data recording system 10 that may be utilized when conducting inspections of railroad system assets as required by the Federal Railroad Administration, or when inspecting other systems wherein assets are distributed among a plurality of remote sites to which a mobile inspector must travel to perform periodic maintenance/inspections. The term asset is used herein in a broad sense to include equipment, structures, locations, persons, etc., and the term inspection is used herein in a broad sense to include actions related to physical inspection by visual, mechanical, electrical, chemical or other means; testing; maintenance; calibration; replacement; or other such activities as may be necessary for remotely distributed assets. For an embodiment utilized with railroad systems, the asset 12 may include any track, wayside, structure or equipment associated with the railroad activities, such as signaling equipment, grade crossing equipment, rolling stock, bridges, rail, tunnels, etc. Equipment 12 located at a particular wayside location may include a plurality of individual units of equipment associated with an equipment bungalow wherein power, control, and/or communication functions are cooperatively linked.

Assets at each location may be associated with a unique asset identifier so that no two locations have the same identifier. The following discussion will describe an embodiment utilized with railroad equipment for which the unique asset identifier may be referred to as a unique equipment identifier. For grade crossing warning equipment in the United States, the unique equipment identifier may be the number assigned by the United States Department of Transportation (DOT). Alternatively, the unique equipment identifier may be the railroad's milepost number, a bungalow number, or a derivative thereof. The unique equipment identifier may be any character set that uniquely identifies a particular location where equipment to be inspected is situated. Individual units of equipment located at a single location may be further associated with the respective unique equipment identifier, such as with a sub-numbering system.

Equipment inspection data recording system 10 includes a portable recording device such as inspection data recording device 14 that is transported by the mobile inspector to the various equipment sites. The system 10 may also include a centralized data management portion 16 for the collection of inspection data from a plurality of similar portable inspection data recording devices 14 and for the analysis of the inspection data. The data management portion 16 may be used for the distribution of the analysis results and related information, for example via a connection to a global information system such as the World Wide Web 18.

The portable inspection data recording device 14 may be built upon any available portable electronic tool, variously configured and described as a personal information manager (PIM), pocket personal computer (PC), personal data assistant (PDA), personal mobile tool (PMT), etc. The portable inspection data recording device 14 includes a processor 20 having various input and output connections, as described more fully below.

A memory 22 is accessible by the processor 20. The memory may be a local portable memory that is transported as part of the portable inspection data recording device 14 and/or a remote memory accessible to the processor 20 via a communications link (not shown). Among other data, the memory 22 may contain a database associating a plurality of unique equipment identifiers with a respective plurality of physical locations for a universe of equipment 12 to be inspected by the mobile inspector utilizing the portable inspection data recording device 14. This association may be accomplished via one or more look-up tables, for example.

An operator-actuated input device such as keyboard 24 may be used to allow the inspector to input data to the processor 20 and memory 22. In addition to a keyboard, other forms of operator-actuated input devices may be used, including but not limited to a joy-stick, roller ball, voice-activated control, etc.

The portable inspection data recording device 14 may also include various input devices designed to receive data directly or indirectly from the equipment 12. Examples of such devices include a barcode reader 26, a USB connection 28, and a sensor 30 such as a voltage meter, current meter, ohmmeter, timer, RF tag reader, etc.

The location of the portable inspection data recording device 14 is determined by a location detector 32 such as a global positioning system (GPS) receiver transported with the portable inspection data recording device 14. The location detector 32 provides a location signal 34 responsive to the current location of the portable inspection data recording device 14. Temporal information may also be provided via a GPS receiver, or alternatively, a separate clock 36 may provide a time signal 38 to processor 20.

A display 40 may function as an output device for displaying a graphical display to the inspector, and/or it may be used as an input device, such as when embodied as a touch-screen display or when used in conjunction with the operator-actuated input device in a point-and-click mode. Data may be communicated through a transceiver 42 via a communication channel 44 to and/or from a centralized database 46 that forms part of the centralized data management portion 16. The communication channel 44 may include wireless cellular or wired telephone communications, satellite communications, Internet connections including a Wi-Fi wireless connection, and transporting the portable data recording device back to a computer for communicating the data via a wired or wireless connection to the computer. Centralized database 46 may be populated with current inspection data for equipment 12 at periodic intervals determined by the inspector by selectively establishing communication link 44 via a suitable transmitter such as transceiver 42. Data contained in centralized database 46 may be manipulated to produce various types of reports, such as reports in compliance with Federal Railroad Administration requirements. One may appreciate that various memories and databases associated with system 10 may be resident on the portable inspection data recording device 14 or may be located off-board the portable inspection data recording device 14 and accessible via the communications channel 44.

Equipment inspection data recording system 10 enables inspection data recording processes that provide improved data integrity when compared to processes achievable with prior art systems, as described more fully below.

The location of equipment 12 to be inspected may be mapped and an identifier may be assigned that is unique to the location of the equipment. For example, the latitude and longitude (or other unique equipment identifier) of a railroad crossing may be measured and recorded in a database such as memory 22 and/or central database 46 and then associated with the equipment located at that crossing. Details regarding the equipment may further be associated with the unique equipment identifier, such as the model number of hardware and/or the revision number of software at each mapped location. The location and equipment information may be displayed in a variety of formats, such as by being superimposed on a map on an Internet web page with hyperlinks provided at points on the map where equipment is located. The hyperlinks may provide additional details regarding the equipment at the particular location of the hyperlink.

The inventory mapping process may be accomplished over a period of time as inspectors visit the various equipment sites for routine inspections. When the inspector arrives at a particular site, the GPS receiver 32 portion of portable inspection data recording device 14 is used to identify the geographic location of the site. An inventory of the equipment at that site may then be accomplished, with the respective equipment inventory being associated with the geographic location in memory 22 and/or in central database 46 via data through communication link 44. The memory/database may be updated over time to reflect service performed to the equipment or any change, addition or modification to the equipment. The database/memory may be accessed by software configured to allow searching in a variety of modes, such as by equipment type, by location, by time since last service date, etc. Data may be presented in any format, including as a web page, wherein hyperlinks are provided to additional levels of detail regarding the equipment.

Memory 22 and/or database 46 may also contain an association between the unique equipment identifier for respective locations and individual ones of a plurality of data recordation forms appropriate for the specific equipment 12 at the respective location. In one embodiment, the forms may be configured to comply with FRA reporting requirements.

To begin an inspection activity, the route of a mobile inspector may be planned by using the equipment location information complied in the inventory-mapping step described above. Memory 22 is programmed with current information relating the unique equipment identifier verses location information, and with current information relating appropriate data recordation forms verses unique equipment identifier, as described above. The inspector then transports the portable inspection data recording device 14 to the location of equipment 12 selected for inspection. The identification of the inspector may be made known to the processor 22 by incorporating logic requiring a password, a secure digital identification card, etc., and operation of the device 14 may be limited to one or more predetermined inspectors. Logic executable by the processor 20 may be programmed into the portable inspection data recording device 14 to provide travel directions to the inspector via display 40 in order to assist the inspector in arriving at the selected equipment location. Such logic may be responsive to the unique equipment identifier for the selected equipment 12 inputted by the inspector, such as via keyboard 24, and to the position signal 34. The selected destination location associated with the inputted unique equipment identifier in memory 22 is compared to the actual location of the device 14 as indicated by location signal 34 to determine appropriate travel directions for display.

Upon arrival at the selected equipment site, the inspector confirms his/her plans for inspection by inputting the unique equipment identifier for the selected equipment. This step may have already been accomplished in order to obtain the travel directions described above, or it may be accomplished upon arrival at the selected site. If the inspector's route was planned geographically without prior knowledge of the unique equipment identifier associated with a particular location, the inspector may execute logic via processor 20 to index memory 22 with the actual location as indicated by location signal 34 to determine the corresponding unique equipment identifier for that location. Alternatively, the inspector may input the selected unique equipment identifier by using keyboard 24, or by scanning a bar code located on the equipment using barcode reader 26, for example.

The portable inspection data recording device 14 may be programmed to allow the recordation and/or transmittal of inspection data only when the device 14 is actually at the location of equipment selected to be inspected. This ensures that the inspector has arrived at the correct location for performing the intended inspection, and it provides an additional level of protection against erroneous data recordation. This also precludes the recordation of fictitious data by a person located away from the actual equipment location. To provide further assurance of data integrity and to provide information useful for work efficiency evaluations, the system may automatically record temporal information related to the arrival and dwell of the data recording device 14 at the particular equipment location and/or at other locations to track the movement of the portable device 14. Both the location and temporal information may be derived from the global positioning system 32.

Figure 2:
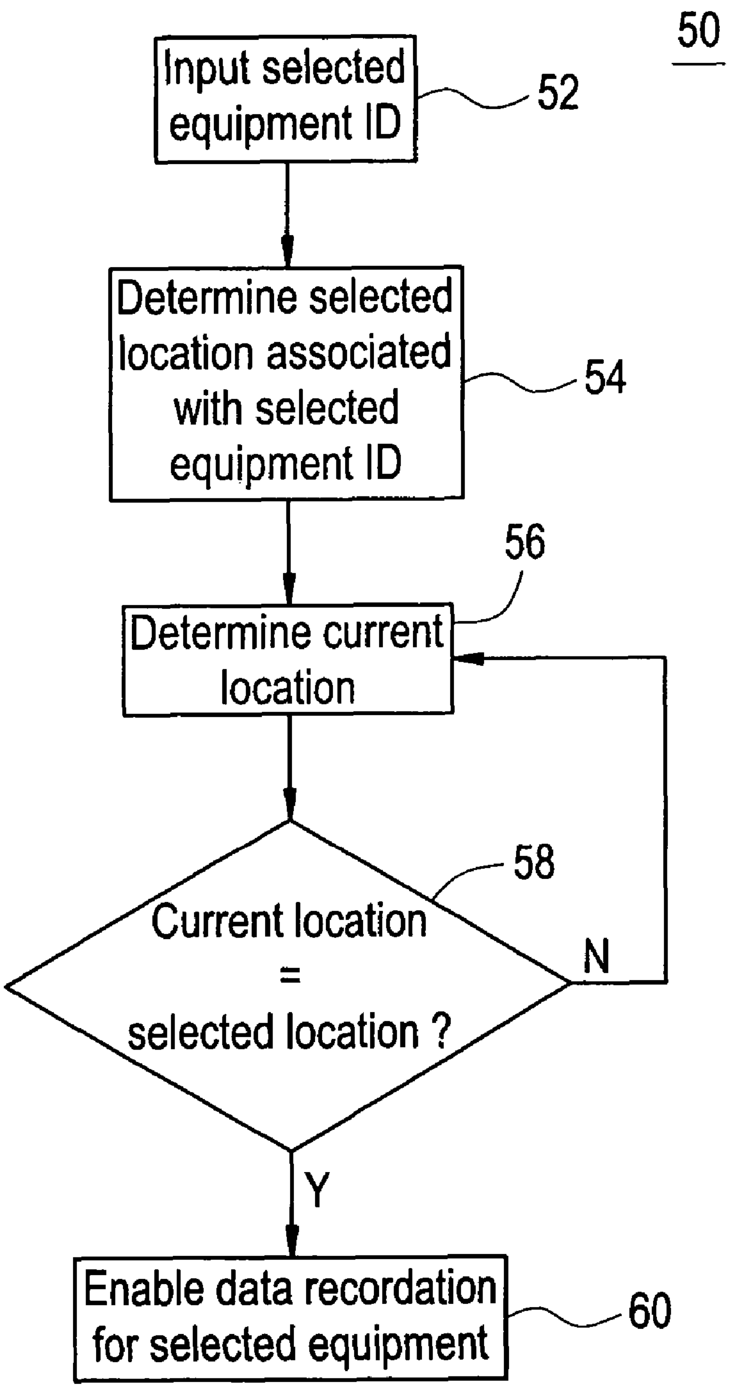
FIG. 2 illustrates steps in a process for enabling data recordation only when a portable data recording device is at a selected equipment location.

In one embodiment, data recording device 14 is provided with logic executable by the processor for indexing memory 22 with the unique equipment identifier that has been inputted by the inspector to identify the associated location of the equipment selected for inspection. FIG. 2 illustrates steps in a process 50 for enabling data recordation only when a portable data recording device is at a selected equipment location. The unique equipment identifier for equipment selected for inspection is inputted at step 52, such as by the inspector typing the identifier into keyboard 24, or scanning a barcode with barcode reader 26 or by pre-programming device 14 with a schedule of planned inspections. The location of the selected equipment is then determined, such as by indexing associated locations saved in memory 22. The current location of the portable data recording device 14 is then determined at step 56 such as with location signal 34. That equipment location is then compared to the actual location of the data recording device 14 at step 58. If the actual location of device 14 does not correspond to the location of the selected equipment, the recordation of inspection data for the selected equipment is precluded and step 56 may be repeated. An error message or travel direction information may be provided to the inspector at this point. If, however, the actual location of device 14 does correspond to the location of the selected equipment, the recordation of inspection data for the selected equipment is enabled at step 60. One may appreciate that other logic schemes may be used accomplish the result of enabling the recordation of data only when the inspector is physically located at the location of the equipment to be inspected.

The closeness of the match between the location of the inspection data recording device 14 and the location of the selected equipment 12 that is necessary to trigger the enablement of the recordation of inspection data may be programmed to any desired tolerance. This relationship may be variously described herein as proximate locations or locations that correspond, or being at a location, etc. While some location tracking systems may have the ability to identify location to within a few meters or less, it may be practical in an embodiment of the present invention to consider the data recording device 14 to be sufficiently close to the selected equipment location to enable data recording if the two location coordinates are within ten meters of each other or other site-appropriate value. For example, this tolerance may be selected to permit the inspector to record data or to transmit data to the off-board database 46 while sitting in a vehicle parked near the equipment 12.

Figure 3:
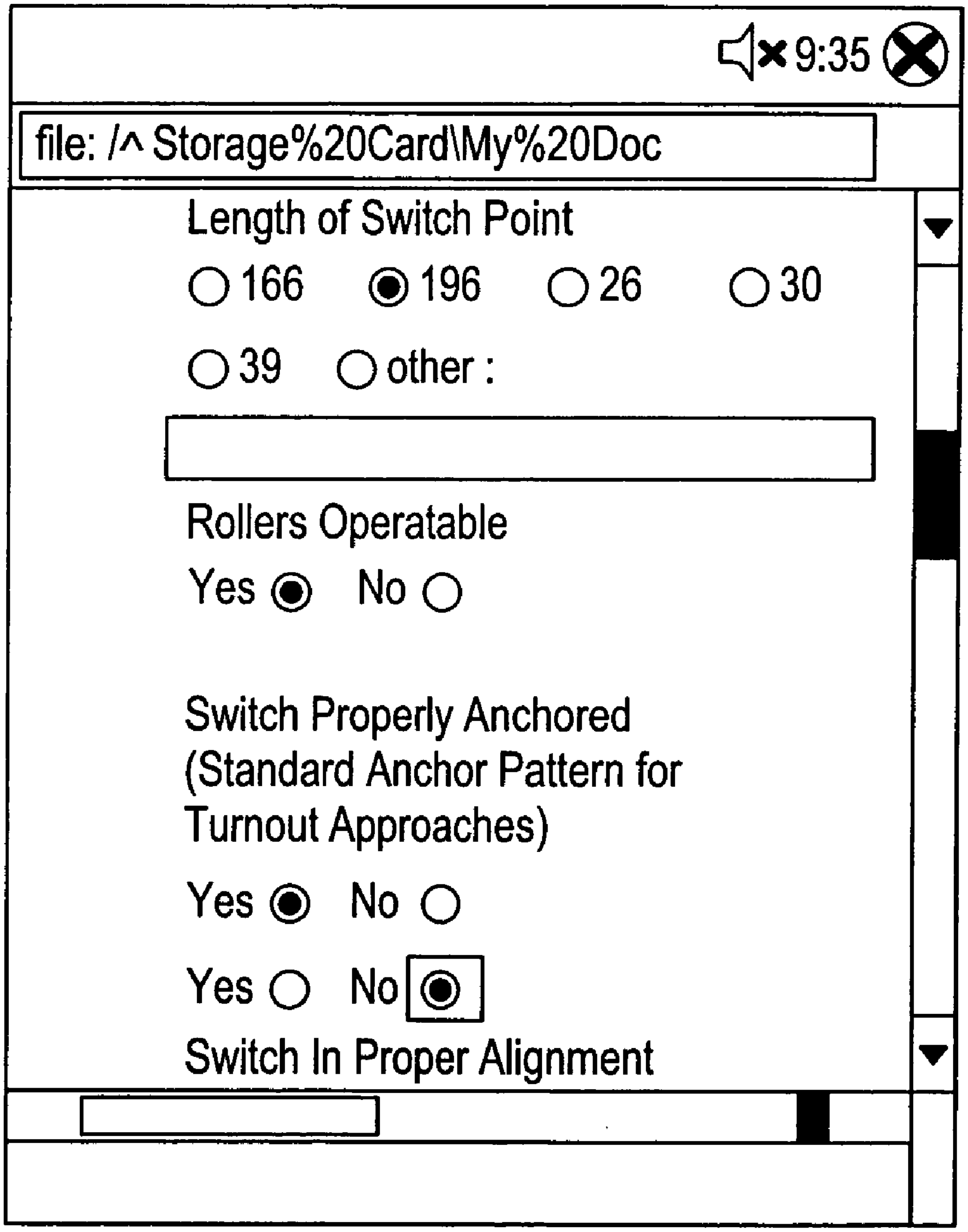
FIG. 3 illustrates an example data input display of a portable inspection data recording device.

The system 10 may enable the recordation of inspection data for the selected equipment 12 by providing an appropriate equipment-specific inspection recordation form(s) to the inspector via display 40 only when the current location indicates that the portable inspection data recording device 14 is proximate the location correlated in memory 22 with the inputted unique equipment identifier. A plurality of equipment-specific data recordation forms may be stored in memory 22, and logic executable by the processor 20 may be responsive to the selected unique equipment identifier inputted by the inspector to present the appropriate form. The format of the inspection data recordation forms may be designed to simplify the effort for the inspector. Data may be input to the data recording device 14 manually via keyboard 24, via a connected bar code reader 26, and/or via connection to other types of equipment at the location or brought to the location by the inspector such as through USB port 28, and via automatic data population responsive to the position signal 34 and/or to the selected unique equipment identifier. Data that may be automatically populated may include, among others, the location; the unique equipment identifier; the identity of the inspector; time data including, for example, time of change of position of the recording device such as may be useful for tracking the movement and activities of the inspector; and data related to the selected asset such as serial numbers, performance information, planned inspection points, warnings and instructions to the inspector, among others. Pull down menus and automatic comparison to permitted data values may be used to improve data integrity. FIG. 3 illustrates an example data input display on the touch screen of a portable digital tool. Temporal information may be automatically recorded. The system 10 may further permit the transmission of inspection data for selected equipment from the portable inspection data recording derive 14 to the centralized database 46 only when the position detection device 32 indicates that the recording device 14 is located at the location of the selected equipment.

While the preferred embodiments of the present invention have been shown and described herein, it will be obvious that such embodiments are provided by way of example only. Numerous variations, changes and substitutions will occur to those of skill in the art without departing from the invention herein. For example, the present invention is not limited to railroad equipment, but may be applied to any application where geographically distributed assets are periodically visited.

The invention claimed is:

1. An apparatus for recording inspection information for geographically dispersed assets, the system comprising:

a processor;

a memory accessible by the processor and containing data associating a plurality of unique asset identifiers with a respective plurality of physical locations;

a portable inspection data recording device for recording asset inspection data;

a data input device associated with the portable inspection data recording device and in communication with the processor and enabling a mobile inspector to input a select one of the plurality of unique asset identifiers that is associated with a selected asset for which an inspection is to be conducted;

a location detector transported with the portable inspection data recording device and providing to the processor a position signal indicative of a current physical location of the portable inspection data recording device; and logic executable by the processor for enabling the recordation of inspection data for the selected asset using the portable inspection data recording device only if the current physical location of the portable inspection data recording device corresponds to a physical location associated in the database with the unique asset identifier inputted by the operator.

2. The apparatus of claim 1, further comprising a timer providing input to the portable inspection data recording device for recording temporal data in association with the inspection data.

3. The apparatus of claim 1, further comprising:

a display associated with the portable inspection data recording device; and logic executable by the processor and responsive to the unique asset identifier inputted by the inspector for displaying on the display a selected data recordation form associated with the selected asset from among a plurality of data recordation forms stored in the memory.

4. The apparatus of claim 3, further comprising logic executable by the processor to automatically populate a data field of the selected data recordation form with data responsive to the position signal.

5. The apparatus of claim 3, further comprising logic executable by the processor to automatically populate a data field of the selected data recordation form with data related to the selected asset.

6. The apparatus of claim 1, wherein the portable inspection data recording device further comprises a bar code reader.

7. The apparatus of claim 1, further comprising:

a database remote from the portable inspection data recording device for maintaining data related to a plurality of assets at a plurality of locations; and a communication channel between the portable inspection data recording device and the database for populating the database with the inspection data.

8. The apparatus of claim 1, further comprising logic executable by the processor and responsive to unique asset identifier inputted by the operator and to the position signal for displaying travel directions for directing the mobile inspector to the selected asset.

9. An apparatus for controlling the gathering of data regarding persons who are associated with a designated location, the apparatus comprising:

a portable electronic tool comprising a processor for performing a data handling operation and a location detector for determining a current location of the portable electronic tool;

logic executable by the processor for enabling the portable tool to be commanded by an operator to perform the data handling operation for data regarding a person associated with the designated location only when the portable electronic tool is located proximate the designated location; and logic executable by the processor for automatically populating a data recordation form with data responsive to the designated location when the location detector detects that the portable electronic tool is located proximate the designated location.

10. The apparatus of claim 9, further comprising logic executable by the processor for enabling the recordation of data regarding the person into a memory via a data input device only when the location detector detects that the portable electronic tool is located proximate the designated location.

11. The apparatus of claim 9, further comprising logic executable by the processor for displaying a data recordation form associated with the designated location only when the location detector detects that the portable electronic tool is located proximate the designated location.

12. The apparatus of claim 9, further comprising:

the portable electronic tool comprising a display; and logic executable by the processor for displaying on the display travel directions from a current location of the portable electronic tool to the designated location.

13. The apparatus of claim 12, wherein the travel directions comprise a map displayed on the display.

14. The apparatus of claim 9, wherein the location detector comprises a global positioning system receiver.

15. The apparatus of claim 9, further comprising:

a transmitter; and logic executable by the processor for enabling the transmitter to transmit data regarding the person associated with the designated location to another location only when the portable electronic tool is located proximate the designated location.

16. The apparatus of claim 15, further comprising:

a memory remote from the portable electronic tool; and logic executable by the processor for enabling the transmitter to transmit data regarding the person associated with the designated location to the remote memory only when the portable electronic tool is located proximate the designated location.

17. The apparatus of claim 9, further comprising:

a receiver; and logic executable by the processor for enabling the receiver to receive data from another location only when the portable electronic tool is located proximate the designated location.

18. A portable hand-held electronic tool for performing a site specific operation commanded by an operator when at a designated site, the portable electronic tool comprising:

a processor;

an input device in communication with the processor for enabling the hand-held tool to receive commands from the operator to perform a site-specific operation;

a location detector in communication with the processor providing a signal indicative of a current physical location of the portable hand-held electronic tool; and logic executable by the processor for enabling the portable hand-held electronic tool to perform the site-specific operation in response to a command that is inputted by the operator only when the portable hand-held electronic tool is located proximate the designated site at the time of the command input; and logic executable by the processor for automatically populating a data recordation form with data responsive to the designated location when the location detector detects that the portable electronic tool is located proximate the designated location.

19. The portable hand-held electronic tool of claim 18, further comprising:

a memory accessible by the processor; and logic executable by the processor for enabling the input of data associated with the designated site to the memory only when the portable hand-held electronic tool is located proximate the designated site.

20. The portable electronic tool of claim 19, wherein the memory is located remote from the portable hand-held electronic tool, the portable hand-held electronic tool further comprising:

a transmitter; and logic executable by the processor for enabling the transmitter to transmit data associated with the designated site to the remote memory only when the portable hand-held electronic tool is located proximate the designated site.

21. The portable hand-held electronic tool of claim 18, further comprising:

a transmitter; and logic executable by the processor for enabling the transmitter to transmit data associated with the designated site to another location only when the portable hand-held electronic tool is located proximate the designated site.

22. The portable hand-held electronic tool of claim 18, further comprising:

a receiver; and logic executable by the processor for enabling the receiver to receive data from another location only when the portable hand-held electronic tool is located proximate the designated site.

23. The portable hand-held electronic tool of claim 18, further comprising logic executable by the processor for enabling the portable hand-held electronic tool to process data related to a physical object at the designated site only when the portable hand-held electronic tool is located proximate the designated site.

24. The portable hand-held electronic tool of claim 23, further comprising logic executable by the processor for enabling the portable hand-held electronic tool to process data related to a piece of operating equipment at the designated site only when the portable hand-held electronic tool is located proximate the designated site.

25. The portable hand-held electronic tool of claim 18, further comprising logic executable by the processor for enabling the portable hand-held electronic tool to process data related to a person associated with the designated site only when the portable hand-held electronic tool is located proximate the designated site.

26. The portable hand-held electronic tool of claim 18, further comprising logic executable by the processor for enabling the portable hand-held electronic tool to process data related to activities performed at the designated site only when the portable hand-held electronic tool is located proximate the designated site.

* * * * *